(12) United States Patent
Lankes et al.

(10) Patent No.: US 8,170,202 B2
(45) Date of Patent: May 1, 2012

(54) METHOD, TERMINAL DEVICE AND COMMUNICATION SYSTEM FOR PROGRAMMING A BUTTON OF A COMMUNICATION TERMINAL DEVICE

(75) Inventors: Holger Lankes, Puchheim (DE); Thomas Lederer, Herrsching (DE); Stephan Schaade, Buchloe (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1084 days.

(21) Appl. No.: 11/990,468

(22) PCT Filed: Jul. 24, 2006

(86) PCT No.: PCT/EP2006/064566
§ 371 (c)(1),
(2), (4) Date: Feb. 14, 2008

(87) PCT Pub. No.: WO2007/025806
PCT Pub. Date: Mar. 8, 2007

(65) Prior Publication Data
US 2009/0225969 A1 Sep. 10, 2009

(30) Foreign Application Priority Data
Aug. 31, 2005 (DE) .................. 10 2005 041 364

(51) Int. Cl.
*H04M 1/00* (2006.01)
*H04M 9/00* (2006.01)
(52) U.S. Cl. .............. 379/419; 379/142.01; 379/142.18; 379/355.01; 379/355.02; 379/433.06; 379/433.07

(58) Field of Classification Search .................. 379/165, 379/142.01, 142.18, 355.01, 355.02, 419, 379/433.06, 433.07
See application file for complete search history.

(56) References Cited

U.S. PATENT DOCUMENTS

| | | | | |
|---|---|---|---|---|
| 4,680,729 A | * | 7/1987 | Steinhart | ........................ 345/173 |
| 5,309,509 A | * | 5/1994 | Cocklin et al. | ................ 379/165 |
| 5,396,547 A | * | 3/1995 | Baals et al. | .................... 379/457 |
| 6,018,571 A | | 1/2000 | Langlois et al. | |
| 2002/0044642 A1 | | 4/2002 | Danner et al. | |
| 2004/0001579 A1 | | 1/2004 | Feinberg et al. | |
| 2004/0165713 A1 | * | 8/2004 | Leighton | ........................ 379/225 |

FOREIGN PATENT DOCUMENTS

| | | |
|---|---|---|
| DE | 42 10 409 C1 | 8/1993 |
| EP | 1 052 836 A2 | 11/2000 |
| WO | WO 01/08383 A1 | 2/2001 |
| WO | WO 02/39681 A1 | 5/2002 |

* cited by examiner

*Primary Examiner* — Ahmad Matar
*Assistant Examiner* — Khai N Nguyen

(57) ABSTRACT

There is described a method, a terminal device, and a communication system for programming a button of a communication terminal device whereby a user input on the communication terminal device activates an application on a data processing device associated with the communication terminal device. The activated application triggers the display of button programming information for selection for a respective button programming. The selection of one of the displayed button programming information messages on the data processing device triggers the assignment of the associated button programming to the button on the communication terminal device.

20 Claims, 1 Drawing Sheet

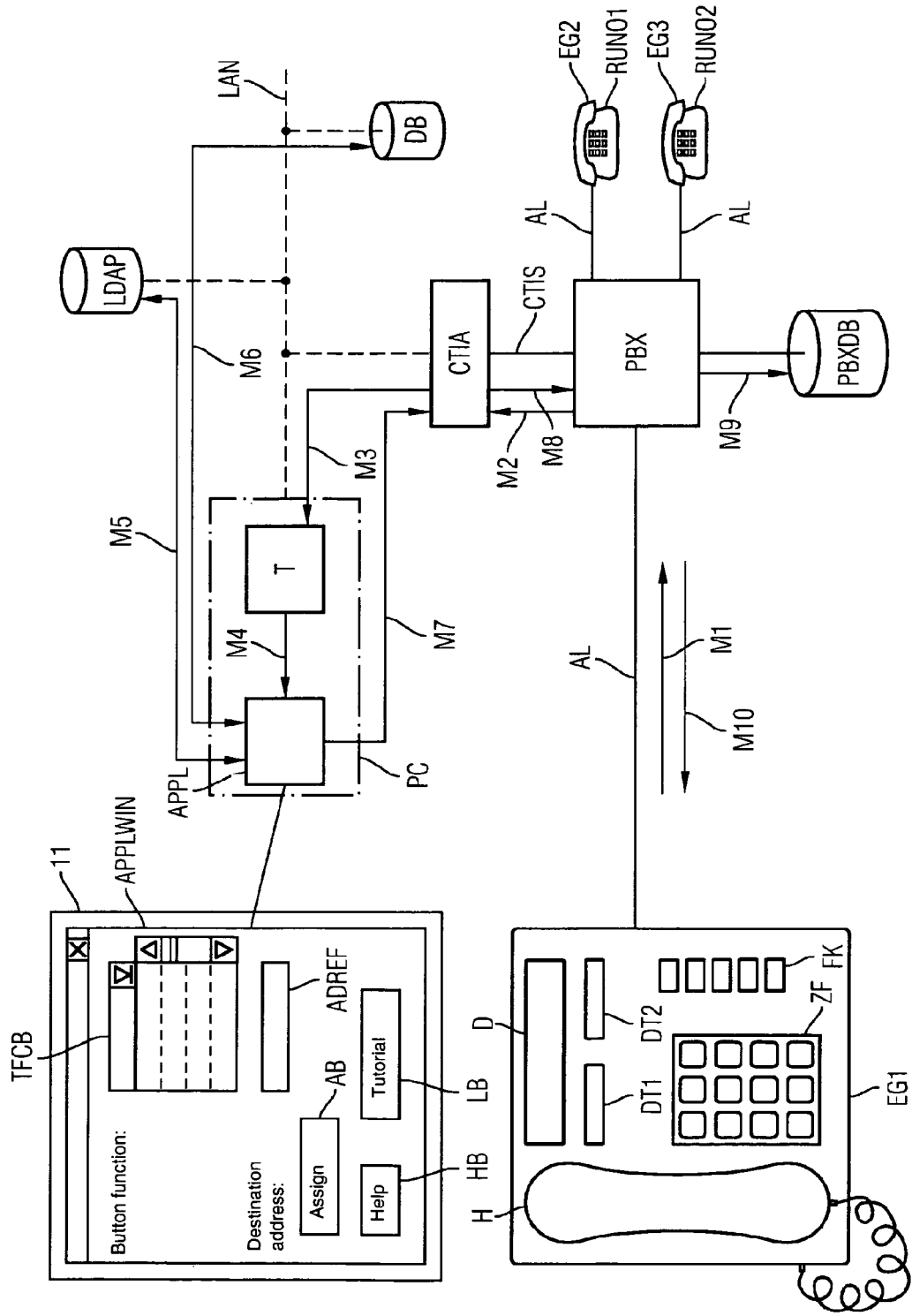

METHOD, TERMINAL DEVICE AND COMMUNICATION SYSTEM FOR PROGRAMMING A BUTTON OF A COMMUNICATION TERMINAL DEVICE

CROSS REFERENCE TO RELATED APPLICATIONS

This application is the US National Stage of International Application No. PCT/EP2006/064566, filed Jul. 24, 2006 and claims the benefit thereof. The International Application claims the benefits of German application No. 10 2005 041 364.1 DE filed Aug. 31, 2005, both of the applications are incorporated by reference herein in their entirety.

FIELD OF INVENTION

It is nowadays customary for touch-tone telephones in communication systems to predominantly offer a facility for programming function buttons. For example a function button can be programmed in such a way that a connection to a call number stored in advance on a function button is established when said function button is pressed.

BACKGROUND OF INVENTION

To program a function button it is often necessary to perform operating steps that are specific to a particular telephone or switching system. Programming a function button usually involves pressing one or more of the touch-tone telephone buttons either simultaneously and/or in sequence, said programming frequently being performed with the aid of a menu-driven controller displayed on the telephone itself.

Depending on the available number of button functions provided, and depending on the complexity of the menu-driven controller displayed, the programming of function buttons can in some circumstances be error-prone and/or time-consuming, in particular if the user has not only to select the button function but also to enter further information such as, for example, when programming a speed-dialing button, entering a subscriber's speed-dialing call number and also in some known systems a character string that the telephone can display, such as the subscriber's name.

SUMMARY OF INVENTION

An object of the invention is to improve the programming of a function button on a terminal device.

This object is achieved by a method with the features which will emerge from an independent claim, by a communication system or terminal device with the features which will emerge from a further independent claim.

Advantageous embodiments and further variants of the invention are specified in the individual claims.

In the inventive method for programming a button of a communication terminal device, the effect of a user input on said communication terminal device—in particular pressing the button, pressing further buttons or selecting a menu entry—is to activate an application on a data processing device associated with the communication terminal device, in particular a workstation computer such as a PC or a mobile terminal device such as a PDA (personal digital assistant). The activated application displays button programming information on a device such as a backlit screen, from where it can be selected for the appropriate button programming. The selection—in particular the manual selection—of one of the button programming information messages displayed on the data processing device causes the button programming associated with the displayed button programming information messages to be assigned to the button on the communication terminal device.

In particular the communication terminal device can be a terminal, a telephone or a telephone application running on a data processing device (said application being known as a soft client) for communicating voice, video and/or multimedia.

Button programming can preferably relate to a button function for triggering a feature of the communication terminal device, and/or a feature of a communication device such as a switching system (known as a gatekeeper or CTI application) coupled to the communication terminal device. The feature may be for example ring back, call diversion, conference calling and/or hands-free calling.

The button programming information messages can be code numbers for the features, or textual representations of said features, for example "ring back", "call diversion", "conference" and/or "hands free".

Once a button has been programmed, the button can be actuated by a user (in particular by pressing said button) in order to trigger the programming assigned to the button. When the button is actuated, the assigned button programming or assigned feature is displayed or executed.

One advantage of the inventive method is that the number of selection steps needed for programming a button is appreciably reduced, thereby shortening the required programming time. It is further advantageous that in most cases a data processing device may have a significantly larger display or monitor than the communication terminal device. Then when selecting button programming information messages, a user can be supported by help texts to explain the selected button programming and/or technical terms, or by demonstrations using graphics or videos to explain the behavior of the button programming when the button is actuated. This improved menu navigation can simplify button programming and reduce operator errors.

Moreover the support of a facility known as a wizard can advantageously be incorporated into the application. Its step-by-step operating procedure enables the selection of button programming information messages to be structured, simplifying button programming to such an extent that even inexperienced end users of the communication terminal device can program buttons for themselves.

In an advantageous variant of the invention in the context of activating the application, information identifying the button, such as a button number, can be transmitted. By this means the application can use the button information transmitted so as to determine which button programming information messages can be selected for the button, and then display only the button programming information messages that are valid for the button, suppressing invalid button programming information messages from the display. This is particularly advantageous in the case of communication terminal devices in which it is impossible to assign every possible button programming to every button, so that operator errors can be prevented.

In a further inventive embodiment of the invention, in the context of displaying button programming information messages, a field such as a selection list for entering or selecting the address information of a further communication terminal device can be displayed by the application. For example, a speed-dialing button function can be selected as the button programming and the destination address information of the further communication terminal device can be entered in the field. Consequently both the speed-dialing button function and the destination address information can be assigned to the button. When the button is later actuated, a connection to the further communication terminal device can be established by means of the destination address information.

In this way button programming can be simplified, in particular complex button programming requiring additional information to be entered. Furthermore a facility for querying a database of call numbers or colleagues can be integrated into the application, so that for example when call numbers need to be selected from a quantity of specified or specifiable call numbers, a selection list preprogrammed with call numbers can be determined and displayed for ease of selection.

This can apply in particular to the assignment of a complex group feature. In such a case it can be necessary to enter a plurality of address details for the further communication terminal devices that are to be assigned to the group, a procedure which would be complicated using a conventional standard terminal.

The group feature can be launched by actuating the button. In the context of launching the group feature, group-specific features for the assigned further communication terminal devices, such as an initiation of a conference call to the further communication terminal devices in the group, can be offered for further selection by the communication terminal device. In particular this selection can be displayed on the communication terminal device or on the data processing device, wherein selecting one of the group-specific features causes the said feature to be executed.

Thus a further logical selection layer can be introduced when selecting features. By first pressing a particular button the user implicitly decides on the group for which he wishes to execute a feature, after which he can select the group-specific feature that he actually wants to run.

On further selection of one of the group-specific features, the address details of the further communication terminal devices in the group can be captured, and can then be utilized when the selected group-specific feature of a communication device is activated. In this way, for example, a conference call between the communication terminal devices of the group can be triggered in a switching system.

Moreover, in the context of further selection it is possible to activate a further application of the data processing device or of a CTI server (where CTI stands for computer telephony integration), and the address details of the group can be transmitted to said further application. For example, by this means it is possible to activate functions that are not specific to communication terminal devices, such as establishing a video conference with the aid of the data processing device, displaying information about the presence of group members, or sending group members an email.

The features of a communication terminal device can thus be advantageously extended, while the functions of a data processing device or server can be executed at the touch of a button.

BRIEF DESCRIPTION OF THE DRAWING

An exemplary embodiment of the invention will be explained in greater detail below with the aid of the accompanying drawing.

This shows a diagram as follows:

FIG. 1 A communication system with three communication terminal devices for executing the inventive method.

DETAILED DESCRIPTION OF INVENTION

FIG. 1 shows a diagram of a communication system for real time communication with a switching system PBX (shown as a rectangle), and a first telephone EG1 as a communication terminal device linked by a connection cable AL to the switching system PBX. Furthermore a second telephone EG2 and a third telephone EG3 are linked to the switching system PBX by further connection cables AL as further communication terminal devices. The second telephone EG2 is assigned a first call number RUNO1 as its address and the third telephone EG3 is assigned a second call number RUNO2 as its address. Moreover a switching system database PBXDB which stores data on subscribers, terminals and connections is linked to the switching system PBX.

Furthermore a CTI application CTIA (where CTI stands for computer telephony integration) is linked to the switching system PBX, to which are also connected a subscriber directory service LDAP storing subscriber data, and a database DB storing miscellaneous data for a PC application or for the CTI application CTIA. The CTI application CTIA, the subscriber directory service LDAP and the database DB are thus networked together over a local area network LAN (indicated by a broken line).

Further, a workstation computer PC (shown as a rectangle) is connected as the data processing device to the local area network LAN, in particular a packet-based data network, wherein the first telephone EG1 and the workstation computer PC represent communication terminals of an individual subscriber. In addition a monitor M of the workstation computer PC (shown as a rectangle) includes among its outputs an application APPL, indicated as a rectangle within the workstation computer PC and shown in greater detail by an application window APPLWIN. The application window APPLWIN is also shown as a rectangle within the monitor M.

The link between the CTI application CTIA and the switching system PBX is provided over a CTI interface CTIS (indicated by a continuous line between the said two components).

In FIG. 1 the first telephone EG1 is shown as a touch-tone telephone, having a function button FK (shown as a rectangle), a numbered dialing keypad ZF, a display D and two menu buttons DT1, DT2 of a display-oriented menu that may be available. The FIGURE also shows a telephone handset H for the first telephone EG1.

The application APPL running on the first workstation computer PC and a proxy application T, likewise running on the workstation computer PC, are indicated as rectangles within the workstation computer PC. Screen outputs from the application APPL are displayed in the application window APPLWIN, wherein the following window components of a graphical user interface (known as widgets) are displayed in the exemplary embodiment:

A button function combobox TFCB captioned "Button function" for entering a button programming information message or for selecting a button programming information message from a prespecified list, an address input field ADREF captioned "Destination address" for the optional input of a destination address for certain button programming information messages, a trigger button AB captioned "Assign" for starting user actions, a help button HB captioned "Help" for opening and displaying a context-sensitive help function for the button programming information message selected on the monitor M, and a tutorial module button LB captioned "Tutorial" for opening and running a context-sensitive tutorial module for the button programming information message selected on the monitor M.

The proxy application T runs permanently on the workstation computer PC, for example, and can receive messages from the CTI application CTIA, for example via an element known as a socket of the computer, and can react to said messages, transmit information from them to the application APPL and initiate the opening of said application APPL.

In an alternative embodiment these functions of the proxy application T can be integrated into the application APPL.

The switching system PBX and the telephones EG1, EG2, EG3 are provided for the purpose of real time communication. As a further alternative to the fixed network telephones shown, a telephone application running on a workstation computer—known as a soft client—or mobile terminal devices can be provided. The switching system PBX can be based on circuit-switched or packet-switched principles, wherein a gatekeeper, a gateway or a server can be integrated by the appropriate means in place of a switching system PBX.

Messages or links between the components described in the introduction are designated M1 to M10 below, and indicated in the FIGURE by lines with single or double headed arrows.

FIG. 1 shows the first telephone EG1 in the idle state. The subscriber who is the user of the first telephone EG1 wishes to program a function into the function button FK. It is the intention in this example to program the function button FK with the call number RUNO1 for the purpose of speed-dialing, so that a call to the second telephone EG2, addressed by the call number RUNO1, can be made later at the touch of a button.

To program the function button FK, the subscriber now presses the function button FK in the manner specific to the terminal—for example by pressing for a number of seconds or by selecting in advance a terminal menu by means of the menu buttons DT1, DT2—and this enters a user input in the first telephone EG1.

As a result of this user input from the subscriber, a button depression message M1 is transmitted from the first telephone EG1 to the switching system PBX. This activates a button programming feature in the switching system PBX, in which context the CTI message M2 is transmitted from the switching system PBX to the CTI application CTIA via the CTI interface CTIS. The CTI message M2 preferably includes a button number for the function button FK that is internal to the switching system, the present programming of the function button FK and possibly further data specific to the switching system and/or connection. The link via the CTI interface CTIS is provided in particular by means of the CSTA protocol (where CSTA stands for computer supported telecommunications application), standardized by the ECMA (European Computer Manufacturers Association), via which the CTI application CTIA is informed about the state and state changes of the switching system PBX.

The CTI application CTIA can thus run on a dedicated computer, in the switching system PBX or on the workstation computer PC.

The CTI application CTIA captures the data transmitted in the CTI message M2. In a further step in the method (not shown) the CTI application CTIA can determine the workstation computer PC associated with the first telephone EG1. For example the associated workstation computer PC can be determined by querying a data set from the subscriber directory service LDAP, said data set being associated with the call number of the first telephone EG1. By querying the call number—which may be converted into a canonic or fully qualified format—data concerning the call number of the first telephone EG1 is read off and returned to the CTI application CTIA. The returned data includes for example an IP address for the workstation computer PC.

The CTI application CTIA then sends the proxy application T of the workstation computer PC determined in this way a call message M3, preferably together with the button number of the function button FK. The proxy application T is either a permanently running process, or is started or reactivated by the CTI application CTIA.

The proxy application T is addressed for example via the determined computer IP address for the workstation computer PC of the first subscriber and a specified port number. The proxy application T is activated for example via what is called a "remote procedure call" RPC.

The proxy application T running on the workstation computer PC receives the call message M3 and transmits the data contained in the message to the application APPL on the same workstation computer PC, and in particular, the button number of the function button FK that was pressed. This information can for example be transmitted by a program call of the application APPL, by inter-process communication or by an exchange of messages. In FIG. 1 this is indicated by the message M4 from the proxy application T to the application APPL.

As an alternative to this embodiment the CTI application CTIA could call the application APPL directly. It would then be possible to do without the proxy application T. In a further alternative embodiment the first telephone EG1 can communicate directly with the workstation computer PC and the application APPL. Generally speaking there only needs to be some form of relation between the first telephone EG1 and the workstation computer PC.

The application APPL is started and activated in a further step in the method, unless already active. The application window APPLWIN is opened and displayed on the monitor M.

If the application APPL needs further subscriber-related data, it can query subscriber data from the subscriber directory service LDAP via the message M5. In addition further resources of the database DB can be queried by means of the message M6. This can be for example a list of all supported button functions or a context-sensitive help text.

In the application window APPLWIN of the activated application APPL the button functions allowed for the function button FK are then entered in the button function combobox TFCB in the form of a text display (referred to below as button function texts) and displayed to the subscriber as button programming information messages from which to make a selection. For example the combobox contains the following entries by way of button programming information messages: "Speed-dial subscriber", "End call", "Query call respondent", "Initiate ring back", "Initiate conference call", "Call waiting" etc.

Consequently subscriber has full control of his application window APPLWIN. He can manually select one of the button function texts and then quit the selection by means of the trigger button AB, a menu item, or a button combination on the keypad of the workstation computer PC.

The application APPL can then perform initial validity checks on the selection. These can be based on internal rules or can be performed by querying the database DB, the CTI application CTIA and/or the switching system PBX.

No further consideration will be given in this document to invalid subscriber entries in the application window APPLWIN and validity checks for avoiding such entries.

Following the selection of one of the displayed button programming information messages, for example "Query call respondent", the application APPL reports the selection to the CTI application CTIA by means of the message M7, and the CTI application CTIA in turn reports the selection to the switching system PBX (by means of the message M8).

In the exemplary embodiment, the switching system PBX then stores in the switching system database a code number associated with the button programming information message, in a data set for the function button FK—message M9. The first telephone EG1 is then informed by means of the message M10 that the function button FK is now to receive the function "Query call respondent" as its new function. The first telephone EG1 or the switching system PBX then assigns the function "Query call respondent" to the function button FK and returns to an idle state.

The programming or configuration of the function button FK is now complete, and pressing the function button FK starts the feature "Query call respondent" on the first telephone EG1 or the switching system PBX.

The switching system PBX and/or the first telephone EG1 preferably manages function buttons and their associated button programming by means of unique codes in the form of identifying button information messages or button programming information messages.

By abstraction from the steps described above, when the subscriber selects one of the displayed button programming information messages, the button programming associated with said button programming information message is assigned to the function button FK of the first telephone EG1 via the application APPL.

Variations and extension of this method are described below.

Programming restrictions can frequently be specified for the buttons of terminal devices that have a plurality of buttons. For example it can be specified that certain buttons can only be programmed with certain functions. There may for instance be a distinction between buttons that represent a function without any additional information and buttons that can store additional call numbers. In such a case the application APPL preferably first of all determines which of the buttons is the function button FK that is going to be programmed, then determines which button programs are allowed for that button, and then displays in the button function combobox TFCB only button programming information messages for the permitted button functions.

Moreover a button function, for example speed-dialing, can require further information to be entered. For example when the button information "Speed-dial" is selected, the application APPL may enable input in the address input field ADREF. At this point the subscriber can enter a destination call number as the address information, for example the call number RUNO1 of the second telephone EG2. Preferably selection of the call number by the application APPL can be supported, so that subscriber data such as names and call numbers are determined with the aid of the message M5 by the subscriber directory service LDAP, and the user need only enter the name of a speed-dialing subscriber—optionally also part-qualified—in order to determine the call number of said speed-dialing subscriber.

Once the trigger button AB is actuated, the call number is transmitted in the messages M7 and M8 to the switching system PBX. The button function "Speed-dial" and the entered call number of the function button FK can then be assigned, so that the function button FK becomes a speed-dialing button. Preferably, not only is a button configuration in the first telephone EG1 or the switching system PBX appropriately changed, but also the change to the button function of the function button FK is notified to the user via the display D or via visual or audible signals by way of confirmation.

This completes the procedure for programming the function button FK.

If the speed-dialing call number represents for example the call number RUNO1 of the second telephone EG2, pressing the function button FK can initiate the establishment of a call to the second telephone EG2 by addressing the call number RUNO1.

The subscriber directory service LDAP mentioned above is based preferably on a database that has a folder structure, it being possible to gain access via the LDAP protocol. Preferably the database is part of what is known as a user management system, that manages all the staff members of a company (such as the subscriber), as well as external contact persons, centrally in the company network and provides standardized access to the data via the LDAP protocol.

By way of example, a data set in the subscriber directory service LDAP consists of values for the subscribers' name, forename, call number, alternative call number, staff number, e-mail address, workstation computer identification, etc. Subscribers are staff members of a company or organization, for example. Preferably the subscriber directory service LDAP contains a data set of the above type for each subscriber or staff member, it being preferably possible to determine entries in the database by using the call number as the unique search criterion.

In an inventive extension, the function button FK can be programmed on two or more levels that are accessible by the use of a shift key on the first telephone EG1. In this event the second level can in particular be programmed in common with the first level. For this purpose the application APPL can for example provide control elements for entering a plurality of button programming information for the plurality of button levels.

The method can be further modified to enable multiple programming of the function button for different operating states of the first telephone EG1. For this purpose the application APPL can arrange for the button programming to be set according to the operating state, whereby the function button FK is programmed with the function "Monitor call respondent" for the idle state of the first telephone EG1, and with "End call" in the call state, for example. By this means a large number of button programs can be assigned to the function buttons when the actual number of buttons is in fact quite small. In this way the subscriber is provided with button programming which is always optimally suited to the call situation.

The previously described steps of the method simplify the programming of a function button and make the process less prone to error, since fewer selection steps need be carried out than is usual. Moreover this also results in time-saving and increased efficiency in the assignment of button programs.

It is furthermore possible to integrate application modules that support button programming into the application APPL. For example the help button HB can be used to output a context-sensitive help text for a button programming information message preselected via the button programming combobox (for example for the button programming information message preselected from the button function combobox TFCB). The help text to be displayed can then be read from the database DB via the message M6. In this way the somewhat complex functions of a communication terminal device can be explained to even an inexperienced user.

In a similar way to the help button HB, the tutorial module button LB can be integrated into the application APPL and used so that for a button programming information message that is preselected via the button programming combobox TFCB, an interactive video tutorial module sensitive to this context is produced. The tutorial module to be displayed can then be read from the database DB via the message M6. Here again, this means that the somewhat complex functions of a communication terminal device can be explained in detail to even an inexperienced user.

As an extension to the previously described method, a complex group button function can also be assigned to the function button FK. This group button function is intended to offer a means of launching very complex group features, provided for a defined group of communication terminal devices by the switching system PBX, the CTI application CTIA or a further application, when the function button FK is pressed on the workstation computer PC. Group features of this kind include for example a telephone conference or a video conference with the configured group members; calling a mail function on the workstation computer PC; e-mailing the members of the group; changing the membership of the group; displaying information on the workstation computer PC about the presence of members; establishing a call to a group member, or to the alternative call number of a group member.

Details such as the call number, name and/or e-mail address of a subscriber are needed in order to execute one or other of the features mentioned.

As previously described, during assignment of the group button function, a user input is entered on the function button FK and the application APPL is activated via the message sequence M1, M2, M3, M4. Furthermore the application APPL also has fields for selecting and/or displaying subscriber-related data such as the name, e-mail address, etc. (not shown). If "group button function" is selected as the button function, the subscriber can then select a plurality of other subscribers by means of the name or call number and assign said subscribers to the group. The application APPL can determine and display the data of the subscribers by accessing the subscriber directory service LDAP via the message M5.

Following selection of a plurality of call numbers in order to accept the call numbers or the associated subscribers into a group, the selected button programming information message, being the group button function and a list of the call numbers for the group, can be transmitted to the CTI application CTIA in the message M7 by activating the trigger button AB. Said application can save the list of call numbers, for example in the database DB, assigned to the function button FK, or transmit said list to the switching system PBX in order for said switching system to save the call numbers assigned to the function button FK. The function "Group button function" is then assigned to the function button FK.

When the group button function is selected by pressing the function button FK programmed with this function, the first telephone EG1, possibly controlled by the switching system PBX or the CTI application CTIA, offers a selection menu in the display D, from which one of a plurality of group features can be selected. If the subscriber then dials via the menu buttons DT1, DT2 for example a group telephone feature such as a conference call to the call numbers of the group members, the selection of the telephone feature is notified to the switching system PBX. The switching system PBX also knows or can determine which group is involved. The switching system PBX then determines the call numbers of the group members and activates the telephone feature, that is, the conference call, for said call numbers.

If the subscriber then dials via the menu buttons DT1, DT2 for example a group feature that is not provided by the switching system PBX, such as for example generating an e-mail to all group members, the sequence of steps is modified as a result. First of all, as before the switching system PBX is notified of the selection of the feature. The CTI application CTIA is informed about the selection of the feature and said application then notifies a further application (not shown) of the workstation computer PC. The CTI application CTIA or the further application determines the call numbers of the group members, for example by reading from the database DB or the switching system database PBXDB, and queries the subscriber directory service LDAP to determine the associated subscriber-related data for each of the respective call numbers, such as the e-mail address.

To query the call numbers in the subscriber directory service LDAP, it can be advantageous to standardize the call numbers of group members in such a way that a query for a call number will unambiguously return a subscriber data set.

The e-mail addresses and further subscriber-related data determined in this way can then be used in the further application to generate an e-mail to a distribution list containing the e-mail addresses that have been determined.

When programming group button functions, as previously described, it is an advantage that features of the switching system PBX and features of an application external to said switching system can be called. Furthermore it is an advantage that central subscriber data can be evaluated and read from the subscriber directory service LDAP when a group feature is activated, and in this way the subscriber data is continually up to date and changes that have occurred in the subscriber data in the meantime are automatically taken into account, since data is not handled twice and said data is determined afresh each time a group feature is activated. Moreover it is an advantage that complex functions can be implemented which can nonetheless be selected and/or run on a computer quickly and without special operator knowledge about an application. It is a further advantage that frequently recurring workflows can be speeded up and a significant increase in subscriber productivity can be achieved.

Whereas the invention in the exemplary embodiment has been explained with the aid of voice terminals, communication terminal devices can also be video or multimedia terminal devices or data terminal devices such as fax machines. The telephones EG1, EG2, EG3 can be software telephone applications of the switching system PBX or terminal devices external to said switching system. Furthermore a circuit-switched or packet-switched method can be used as the communication method and the telephones EG1, EG2, EG3 can be circuit-switched terminals or packet-switched terminals.

The invention claimed is:

1. A method for programming a button of a communication terminal device, comprising:
   providing user input to the communication terminal device;
   sending the user input to a switching system to activate a button programming feature of the switching system;
   the switching system sending a Computer Telephony Integration ("CTI") message to a CTI Application ("CTIA") in response to receiving the user input from the communication terminal device, the CTI message comprising information identifying a button of the communication terminal device to be programmed and information identifying present programming assigned to the button to be programmed;
   the CTIA sending a call message for receipt by an application of a computer device associated with the communication terminal device;
   the application of the computer device querying subscriber data of a subscriber associated with the communication terminal device from a subscriber directory service;

the application of the computer device causing a display of a window that shows a plurality of button functions allowed for the button identified in the CTI message sent by the switching system to the CTIA;

the application of the computer device receiving a function input, the function input providing a selection of one of the shown button functions;

the application of the computer device checking a validity of the selection provided by the function input based on the queried subscriber data prior to assigning the selection to the button to be programmed;

the application of the computer device transmitting a reporting message to the CTIA reporting the selection of the one of the shown button functions;

the CTIA reporting the selection of the one of the shown button functions to the switching system; and sending a programming message to the communication terminal device informing the communication terminal device that the button to be programmed is assigned the selection of the one of the shown button functions.

2. The method of claim 1, wherein checking the validity of the selection provided by the function input comprises checking internal rules, querying a switching system database, querying the CTIA, or querying the switching system.

3. The method of claim 1, wherein the selection of the one of the shown button functions comprises a feature of a communication device coupled to the communication terminal device.

4. The method of claim 1, wherein the CTI message comprises data specific to the switching system or data specific to a connection between the communication terminal device and the switching system.

5. The method of claim 1, wherein the CTIA sending the call message for receipt by the application of the computer device associated with the communication terminal device comprises the CTIA sending the call message to a proxy application of the computer device, and the proxy application receiving the call message and causing transmitting of data in the call message to the application of the computer device, and wherein the proxy application having an address comprising an IP address of the computer device and a specified port number of the computer device.

6. The method of claim 5, wherein the transmitting of the data in the call message to the application of the computer device comprises transmitting of the data by a program call or transmitting by inter-process communication.

7. The method of claim 1, wherein the selection of the one of the shown button functions comprises a speed-dialing button function for initiating a connection to a further communication terminal device, and the method further comprising assigning address information of the further communication terminal device to the button to be programmed such that when the button is actuated, a connection to the further communication terminal device is established based upon the address information of the further communication terminal device.

8. The method of claim 1 further comprising selecting a plurality of addresses of a plurality of additional communication terminal devices, and assigning the plurality of additional communication terminal device addresses to the button to be programmed.

9. The method of claim 1 further comprising selecting at least one address of an additional communication terminal device from a selection list displaying address information of a plurality of additional communication terminal devices or entering at least one name of a user associated with one of a plurality of additional communication terminal devices in an address input field of the application of the computer device.

10. The method of claim 1 wherein the selection of the one of the shown button functions comprises a presence operation displaying information about a presence status of a user associated with an additional communication terminal device.

11. The method of claim 1 further comprising displaying text that explains the selection of the one of the shown button functions or displaying at least one demonstration that explains the selection of the one of the shown button functions.

12. The method of claim 1 wherein the selection of the one of the shown button functions comprises an operation selected from the group consisting of a ring back operation, a call diversion operation, a conference operation, and a hands free operation.

13. The method of claim 1 wherein the communication terminal device is a device selected from the group consisting of a terminal, a telephone, and a telephone application running on the computer device.

14. The method of claim 1 wherein the computer device is a device selected from the group consisting of a workstation, a personal computer, a mobile terminal device, and a personal digital assistant.

15. The method of claim 1 further comprising the application of the computer device determining a plurality of button programs that are allowed for the button to be programmed based on the queried subscriber data.

16. The method of claim 1 wherein the selection of the one of the shown button functions is activated by using the button to be programmed and a further key of the communication terminal device.

17. The method of claim 1 wherein the selection of the one of the shown button functions comprises a group operation, the method further comprising selecting a plurality of call numbers as a group, and the switching system storing the selected plurality of call numbers such that when the button is activated the switching system determining the plurality of call numbers of the group.

18. The method of claim 17 further comprising standardizing the plurality of call numbers of the group such that a subscriber data set is returned for a query based on one call number of the plurality of call numbers of the group.

19. The method of claim 17 wherein the group operation comprises a presence operation displaying information about presence of each user associated with the plurality of call numbers in the group.

20. The method of claim 1 wherein the button to be programmed is a first button, and the method further comprising:

providing a second user input to the communication terminal device to program a button function that is executed by depressing the first button and a second button at a same time;

sending the second user input to the switching system to activate the button programming feature of the switching system;

the switching system sending a second CTI message to the CTIA in response to receiving the second user input from the communication terminal device, the CTI message comprising information identifying the first and second buttons of the communication terminal device to be programmed and information identifying present programming assigned to when both the first and second buttons are pressed at the same time;

the CTIA sending a second call message for receipt by the application of the computer device associated with the communication terminal device;

the application of the computer device querying subscriber data of the subscriber associated with the communication terminal device from the subscriber directory service;

the application of the computer device causing the display of the window that shows a second plurality of button functions allowed for when both the first button and the second button identified in the second call message sent by the switching system to the CTIA are pressed at the same time;

the application of the computer device receiving a second function input, the second function input providing a second selection of one of the shown button functions for when the first button and second button are pressed at the same time;

the application of the computer device checking a validity of the second selection provided by the second function input based on the queried subscriber data prior to assigning the second selection to on occurrence of the first and second buttons be pressed at the same time;

the application of the computer device transmitting a second reporting message to the CTIA reporting the second selection;

the CTIA reporting the second selection to the switching system; and sending a second programming message to the communication terminal device informing the communication terminal device that the first and second buttons are assigned the second selection when both the first and second buttons are pressed at the same time.

* * * * *